(12) United States Patent
Toriumi et al.

(10) Patent No.: US 7,904,927 B2
(45) Date of Patent: Mar. 8, 2011

(54) MOBILE TERMINAL, TV PROGRAM RECORDING SYSTEM FOR MOBILE TERMINAL, AND TV PROGRAM RECORDING PROGRAM

(75) Inventors: Go Toriumi, Tokyo (JP); Akira Kato, Tokyo (JP)

(73) Assignee: NEC Corporation, Tokyo (JP)

( * ) Notice: Subject to any disclaimer, the term of this patent is extended or adjusted under 35 U.S.C. 154(b) by 733 days.

(21) Appl. No.: 11/719,206

(22) PCT Filed: Nov. 14, 2005

(86) PCT No.: PCT/JP2005/021198
§ 371 (c)(1),
(2), (4) Date: Jul. 18, 2007

(87) PCT Pub. No.: WO2006/052027
PCT Pub. Date: May 18, 2006

(65) Prior Publication Data
US 2008/0274768 A1 Nov. 6, 2008

(30) Foreign Application Priority Data
Nov. 12, 2004 (JP) ................................ 2004-328878

(51) Int. Cl.
*H04N 7/20* (2006.01)
*H04N 7/173* (2006.01)

(52) U.S. Cl. ........................ 725/62; 725/112; 725/116

(58) Field of Classification Search ................... 386/86; 725/62, 112, 116
See application file for complete search history.

(56) References Cited

U.S. PATENT DOCUMENTS
2004/0052504 A1* 3/2004 Yamada et al. ................ 386/68

FOREIGN PATENT DOCUMENTS

| JP | 2004-23111 A | 1/2004 |
|----|----|----|
| JP | 2004140460 A | 5/2004 |
| JP | 2004-193973 A | 7/2004 |
| JP | 2004-200978 A | 7/2004 |
| JP | 2004289372 A | 10/2004 |
| JP | 2005-184316 A | 7/2005 |

* cited by examiner

*Primary Examiner* — Hunter B Lonsberry
(74) *Attorney, Agent, or Firm* — Sughrue Mion, PLLC

(57) ABSTRACT

A mobile terminal 10, which includes a TV receiver to receive a broadcast of a TV program and which is provided with the function of recording and pre-programming a received TV program, uses the detection parts (151, 152, 153) to detect the occurrence of an event which will preclude the operation of the TV program recording function, and uses the message transmission/reception part 155 to instruct the recording or pre-programming of an in-recording or pre-programmed TV program, based on an instruction from the event occurrence detection part 154, to a server device 20 or a video recorder 30, which is an external recording device having the TV program recording function and connected with the mobile terminal via a communication line (50).

30 Claims, 11 Drawing Sheets

FIG. 5

160 EVENT DETERMINATION TABLE

| EVENT | RECORD OR PRE-PROGRAM INSTRUCTION |
|---|---|
| MEMORY SHORTAGE | A |
| MOVING PICTURE/AUDIO REPLAY FUNCTION | B |
| MOVING PICTURE/AUDIO RECORDING FUNCTION | B |
| CAMERA FUNCTION | B |
| TELEPHONE/COMMUNICATION FUNCTION | B |
| BATTERY EXHAUST | A |

FIG. 6

110 RECORDED PROGRAM INFORMATION TABLE

| 110-1 | 110-2 | 110-3 | 110-4 | 110-5 | 110-6 |
|---|---|---|---|---|---|
| TV PROGRAM NAME | BROADCAST STATION | RECEIVING CHANNEL | RECORDING START TIME | RECORDING END TIME | RECORD OR PRE-PROGRAM INSTRUCTION |
| AAA | S1 | C1 | 5:00 | 5:30 | COMPLETED |
| BBB | S2 | C2 | 6:00 | 7:00 | COMPLETED |
| CCC | S3 | C3 | 10:00 | 10:15 | YET TO BE COMPLETED |
| . | . | . | . | . | . |

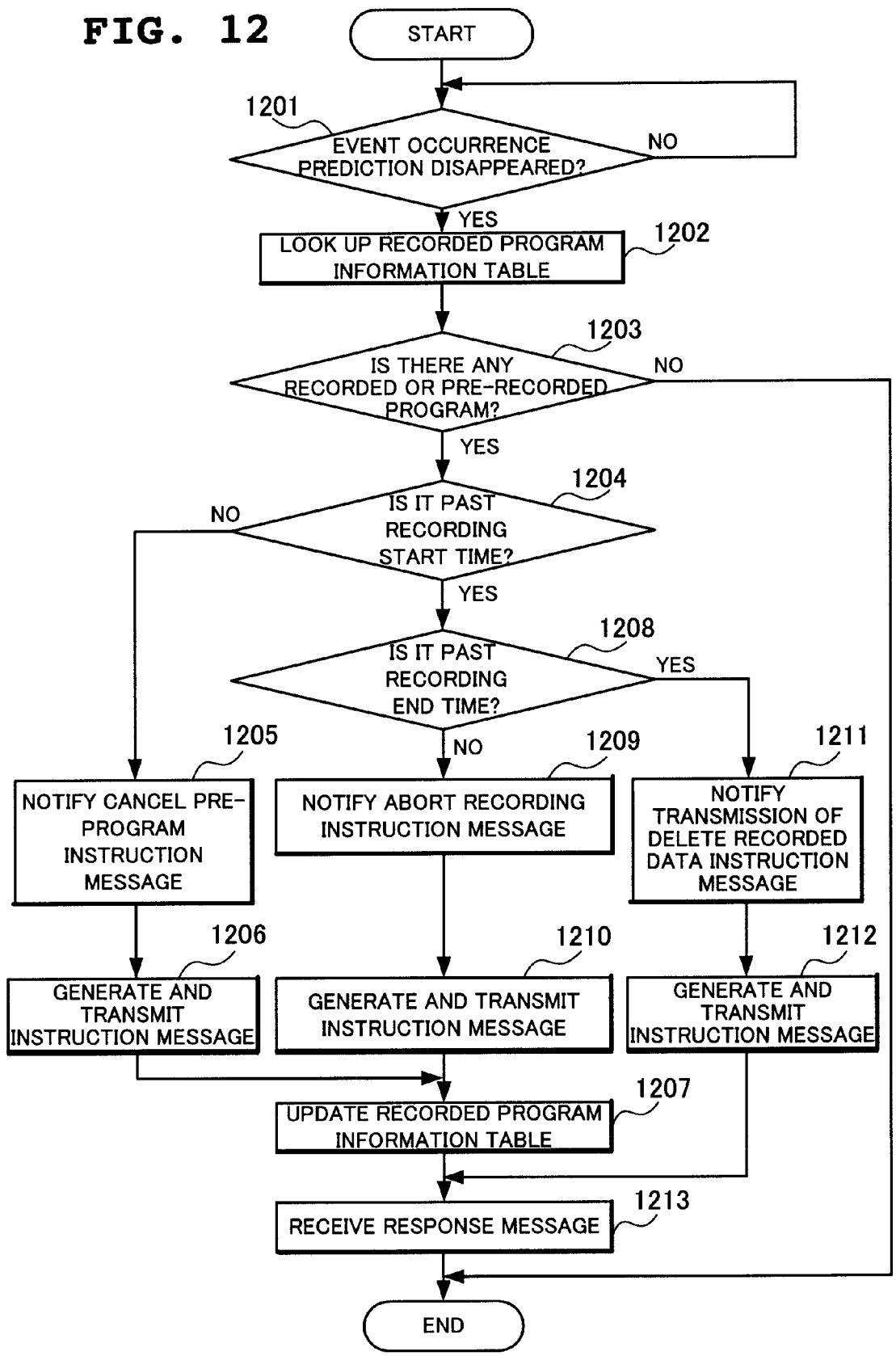

MOBILE TERMINAL, TV PROGRAM RECORDING SYSTEM FOR MOBILE TERMINAL, AND TV PROGRAM RECORDING PROGRAM

INCORPORATION BY REFERENCE

This application is based upon and claims the benefit of priority from Japanese patent application No. 2004-328878, filed on Nov. 12, 2004, the disclosure of which is incorporated herein in its entirety by reference.

Field of the Invention

The present invention relates to a mobile terminal, such as a cellular phone capable of receiving TV broadcasts, and a TV program recording system for a mobile terminal. More specifically, the present invention relates to a mobile terminal and a TV program recording system for a mobile terminal which are enabled to record a TV program onto an apparatus, such as a recording server device or a video recorder, as well as to issue a record instruction to such apparatus, from a mobile terminal via a network.

Description of the Related Art

In recent years, many countries throughout the world have launched, or announced their plans to launch, TV broadcasts which can be viewed using a TV receiver incorporated in a mobile terminal (e.g., a cellular phone and a PDA), a representative example of which being terrestrial digital broadcasts in Japan.

By carrying a mobile terminal provided with such a TV broadcast receiver, it becomes possible to view a TV program or record a favorite TV program even while on the road.

An example of mobile terminal provided with a TV broadcast receiver is a recording apparatus proposed in Japanese Patent Laying-Open No. 2004-023111 (Patent Literature 1).

In addition to the capability to pre-program the recording of a TV program, the portable television receiver (recording apparatus) disclosed in this Patent Literature 1 is configured to register the pre-program location for the pre-programmed TV program in a pre-program database. If the detected current location differs from the pre-program location for the TV program, the portable television receiver updates the content of the pre-program based on the broadcast channel information and broadcast time information at the current location. If the pre-programmed TV program will not be broadcast at the current location, the portable television receiver instructs the VTR, which is to be designated via the public line or audio line, to perform a proxy recording of the TV program.

When recording or pre-programming a TV program while on the road, the above-described mobile terminal with a TV broadcast receiver poses a number of problems as described below.

First, the mobile terminal disclosed in the above-mentioned Patent Literature 1 may fail to record or pre-program a TV program due to resource competition with other application.

"Resource competition" means competition for resources, such as the CPU, bus, and receiver, within the mobile terminal. In this competition, the TV program recording function competes with other functions, i.e., camera function (application), voice call function and TV phone function, for the use of the CPU, bus, receiver and other components.

The second problem is that a recording may stop in the middle due to the depletion of the battery (or battery exhaustion), or the recording of a pre-programmed TV may not start due to battery exhaustion.

Third, this mobile terminal has a problem in that the recording of a TV program may be interrupted or the pre-programmed recording of a TV program may not be performed properly if the recording memory or recording medium (removable medium) runs out of storage capacity or if the mobile terminal moves out of the broadcast area for the TV program into the dead space.

Furthermore, the portable television receiver disclosed in Patent Literature 1 is designed to change a pre-program if the location where the pre-programming was performed differs from the current location, i.e. if the broadcast area in which the pre-programming was performed differs from the broadcast area in which the portable television receiver is currently located. The portable television receiver is also designed to instruct the designated VTR to perform the proxy recording of a TV program if the TV program cannot be received in the current broadcast area. In this case, the problem still remaining unsolved is that the recording may be interrupted or the pre-programmed recording may fail to start when the TV program recording function competes with other functions for the use of resources.

Finally, there is no solution proposed against the problems of battery exhaustion and shortage of the memory capacity for recording.

SUMMARY OF THE INVENTION

The first object of the present invention is to resolve the problems held by the above-described related art by providing a mobile terminal and a TV program recording system for a mobile terminal which can avoid a TV program from failing to be recorded when it becomes impossible to record the TV program due to resource competition with other functions by means of instructing another recording equipment to record or pre-program the TV program.

The second object of the present invention is to provide a mobile terminal and a TV program recording system for a mobile terminal which can avoid a TV program from failing to be recorded due to battery exhaustion or shortage of the memory capacity for recording.

The third object of the present invention is to provide a mobile terminal and a TV program recording system for mobile terminal which can avoid a TV program from failing to be recorded by proactively detecting that the recording of the TV program will become impossible due to resource competition with other functions, battery exhaustion or shortage of the recording memory and then instructing another recording equipment to record or pre-program the TV program.

Events that preclude the operation of the recording function refers to those that prevent the start of the viewing or recording of a broadcast program which was pre-programmed and is being received by the terminal due to above-described resource competition, battery exhaustion, etc., even though the terminal itself is in an area and a state where it can receive the pre-programmed broadcast program. These events include when it becomes, or is likely to become, impossible to continue to receive the pre-programmed TV program because the owner of the terminal has moved to outside the broadcast area while he or she is receiving the TV program.

According to exemplary aspect of the invention, a mobile terminal which includes a TV receiver to receive a broadcast of a TV program and which is provided with the function of recording and pre-programming a received TV program, comprising the function of detecting the occurrence of an event which will preclude the operation of the recording function of said TV program, and instructing the pre-programming of an in-recording or pre-programmed TV program to an external recording device which is provided with the function of recording a TV program and which is connected with the mobile terminal via a communication line.

Therefore, according to the present invention, it becomes possible to avoid a TV program from failing to be recorded due to the occurrence of an event that precluded the operation of the TV program recording function, because the present invention detects an occurrence or predicts a possibility of the occurrence of such an event and instructs an external recording device to either record the in-recording TV program or to pre-program the recording of the pre-programmed TV program, as applicable.

BRIEF DESCRIPTION OF THE DRAWINGS

FIG. 5 is a diagram which shows a configuration example of an event determination table according to the first embodiment of the present invention;

FIG. 6 is a diagram which shows a configuration example of a recorded program information table according to the first embodiment of the present invention;

FIG. 12 is a flow chart which illustrates the operation of a mobile terminal according to the fourth embodiment of the present invention performed to instruct the abortion of a recording, the cancellation of a pre-program and the deletion of recorded data.

DESCRIPTION OF THE PREFERRED EMBODIMENT

The exemplary embodiments of the present invention will now be described in detail with reference to the drawings.

Figure 3:
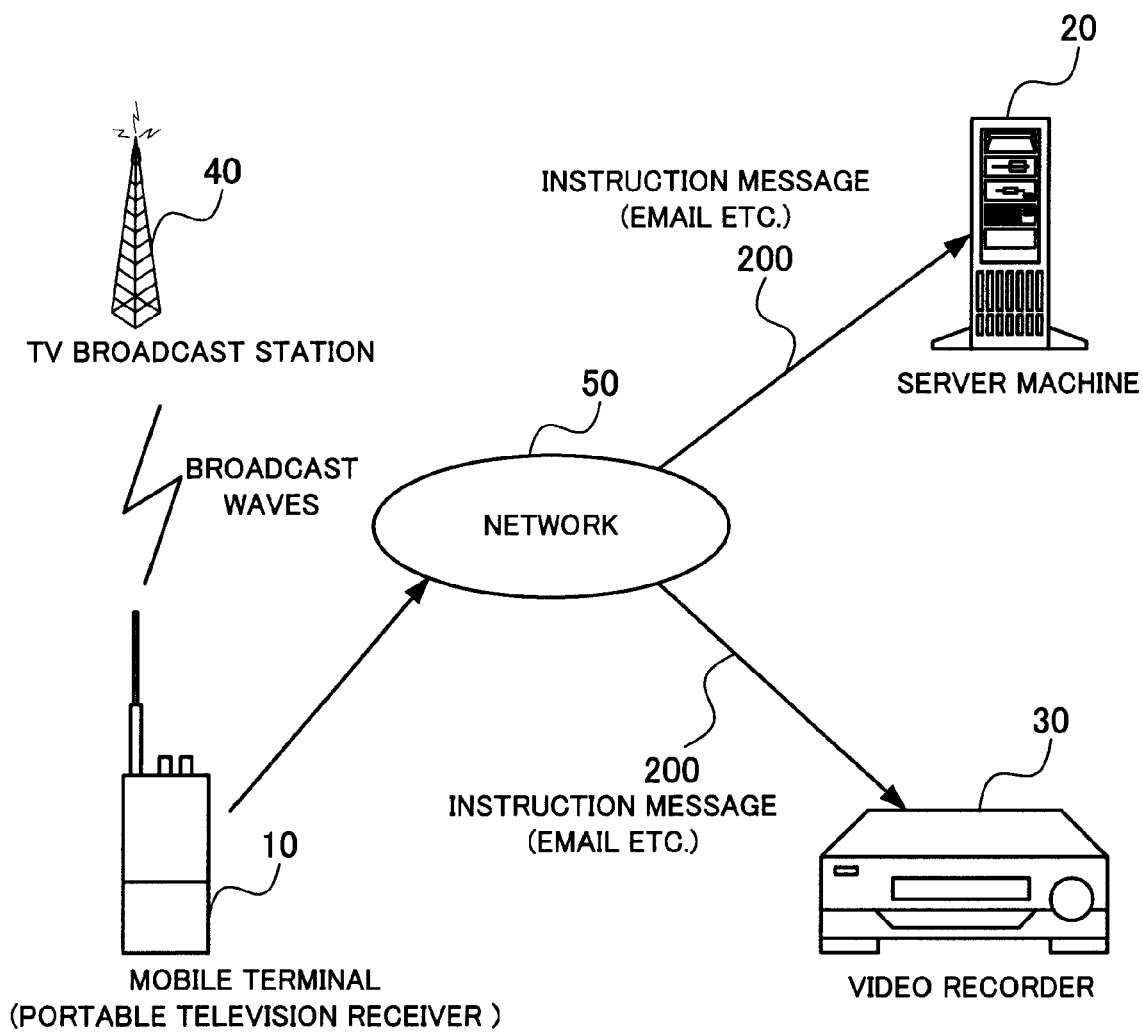
FIG. 3 is a diagram which shows a TV program recording system for the mobile terminal according to the first embodiment of the present invention.

FIG. 3 is a diagram which shows a TV program recording system for a mobile terminal according to the first exemplary embodiment of the present invention.

In FIG. 3, the mobile terminal 10 with the TV reception function according to this embodiment allows the user to view or record a program selected by the user by receiving broadcast waves from a TV station 40.

The mobile terminal 10 is connected with a server device with a TV recording function 20 and/or a video recorder (home server) 30 which is a device to record TV programs in HDDs, DVDs or other recording media, via a network 50, including the Internet, and is capable of communicating with these devices using messages, such as normal email messages or short messages.

Various server devices 20 and video recorders 30 which can communicate with other devices using messages via the Internet or other network 50 have conventionally been available on the market, and can be used as the devices other than the mobile terminal 10 for this embodiment.

For example, any of the TV recording proxy server services provided by various content providers may be used to perform the functions of the TV recording server device 20.

The mobile terminal 10 with a TV reception function according to this embodiment has a function to instruct, by use of an email message or a short message, the server device with a TV recording function, which is connected with the mobile terminal 10 via a communication line including the Internet, to record or pre-program the recording of a TV program if a specific event occurs that will preclude the recording of the TV program during a period from the completion of the pre-programming until the start of the recording or in the middle of the recording.

Possible examples of specific events that preclude the recording operation as described above include:

(1) Activation of the normal audio ring alert function, TV phone ring alert function or other specific functions, such as the digital camera photographing function incorporated in the mobile phone (i.e., activation of the application which realizes any of these functions)

(2) Depletion of the battery mounted on the mobile terminal 10 (battery exhaust)

(3) Shortage of the memory capacity of the storage medium which stores data of a recorded TV program, such as an embedded memory (HDD or DRAM) and a removable media (memory card)

(4) Inability to receive the program because the user has moved to outside the broadcast area (including a change to another channel because the user has moves into another broadcast area)

Figure 2:
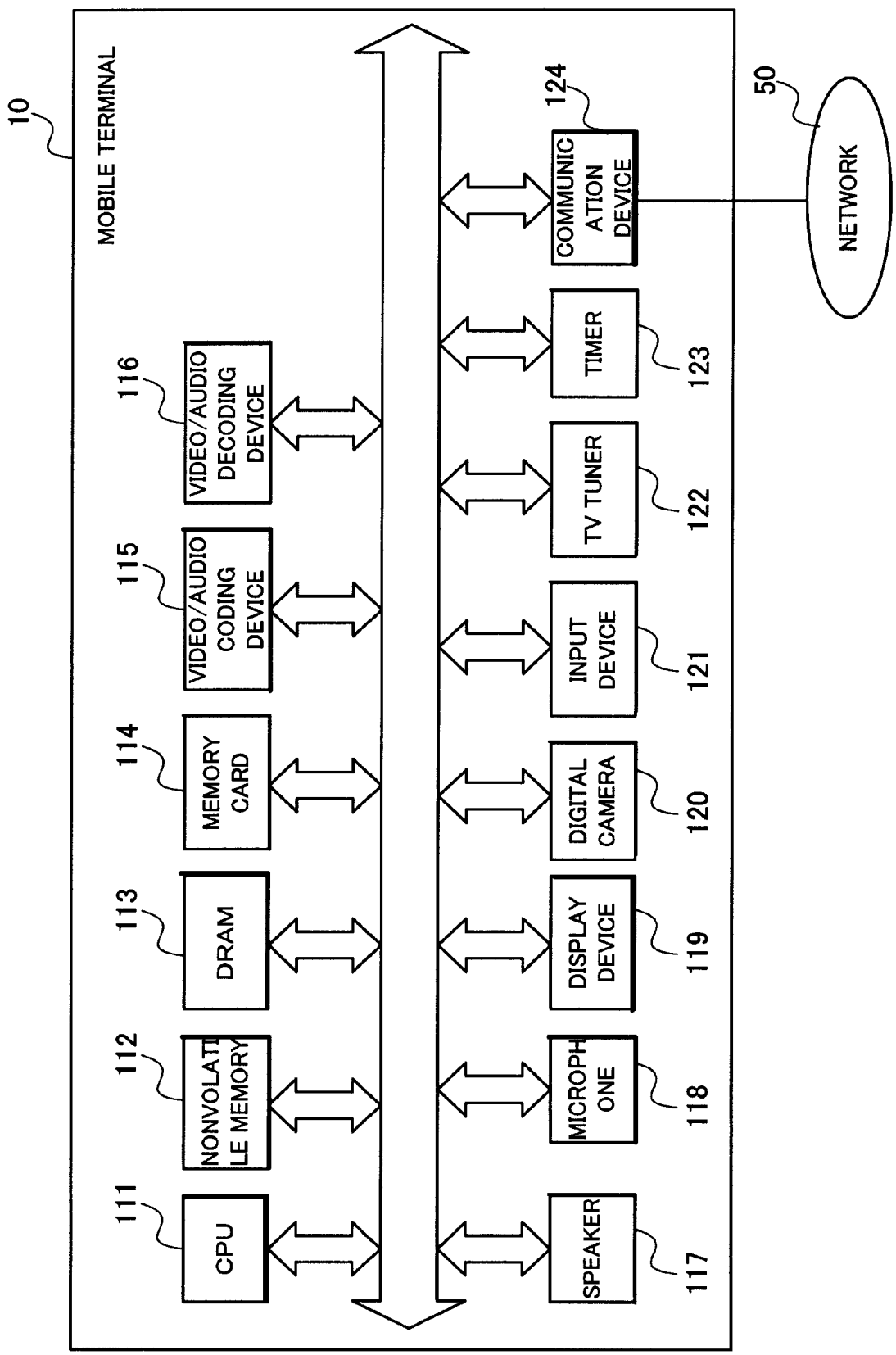
FIG. 2 is a block diagram which shows a hardware configuration of the mobile terminal according to an embodiment of the present invention.

FIG. 2 shows the hardware configuration of the mobile terminal 10 according to this embodiment. The hardware configuration in FIG. 2 relates to when the mobile terminal 10 is a cellar phone with functions to review and record TV programs.

In FIG. 2, the mobile terminal 10 is configured to have a CPU 111, a nonvolatile memory 112, a DRAM 113, a memory card 114, a video/audio coding device 115, a video/audio decoding device 116, a speaker 117, a microphone 118, a display device 119, a digital camera 120, an input device 121, a TV tuner 122, a timer 123 and a communication device 124.

The CPU 111 provides the mobile terminal 10 with the telephone function, the TV telephone function, the TV viewing/recording function and other terminal functions by executing the programs designed to provide these functions (applications) which are stored in the nonvolatile memory 112 and the DRAM 113.

The characteristic function of the exemplary embodiment according to the present invention, that is, the function to instruct the server device 20 and the video recorder 30 to record a target program when the target program has encountered a specific event that prevents the target program from being recorded, by means of communication via a message, can be realized by implementing a circuit part in which programs to realize the above-mentioned functions have been embedded. It should be noted, however, that these functions can also be realized by storing the TV recording program, which is the characteristic function of the exemplary embodiment (application), in the nonvolatile memory 112 or the DRAM 113 and by having the CPU 111 execute such TV recording program.

The memory card 114 is a storage medium to be removably inserted into the slot provided on the mobile terminal 10, examples of which being an SD memory and a CompactFlash (registered trademark) memory, and stores various kinds of data transmitted and received by the mobile terminal 10 (such as email, personal information data and applications), video data of TV programs recorded by the TV recording function and other information, as with the above-mentioned DRAM 113.

The video/audio coding device 115 and the video/audio decoding device 116 are circuit devices to encode and decode video and sounds during voice telephone/TV telephone calls and TV program viewings/recordings. These devices are the same as conventionally available products and thus can be utilized without any modification.

Explanations of the display device 119 which consists of a speaker 117, a microphone 118 and an LCD, the input device 121 which consists of a digital camera 120, the input device 121 which consists of various operation keys, the TV tuner 122, the timer 123 and the communication device 124 are omitted because these are the components generally incorporated in a mobile terminal implemented as a cellar phone with a TV reception function. The mobile terminal of the exemplary embodiment is provided with a battery and other accessories, to be described below, in addition to the components shown in FIG. 2.

Figure 1:
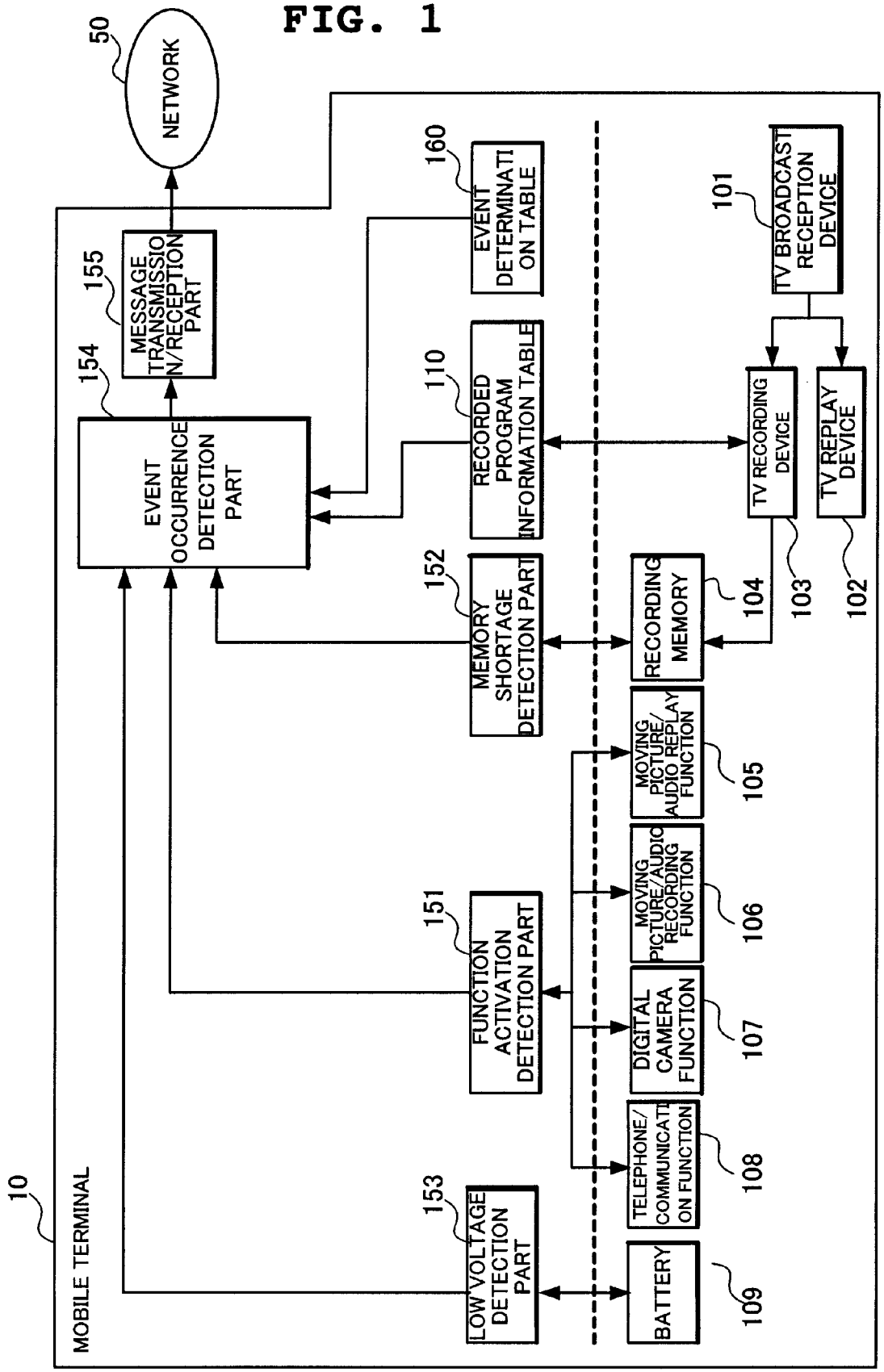
FIG. 1 is a functional block diagram which shows the functions of a mobile terminal according to the first embodiment of the present invention implemented as a cellular phone with a TV reception function.

FIG. 1 is a functional block diagram which shows the functions of a cellular phone according to this embodiment implemented as a cellular phone with a TV reception function of the mobile terminal 10.

In FIG. 1, the mobile terminal 10 has a TV broadcast reception device 101, a TV replay device 102, a TV recording device 103, a recording memory 104, a moving picture/audio replay function 105, a moving picture/audio recording function 106, a digital camera function 107, a telephone/communication function 108 and a battery 109.

In addition, this embodiment includes a recorded program information table 110, a function activation detection part 151, a memory shortage detection part 152, a low voltage detection part 153, an event occurrence detection part 154, a message transmission/reception part 155 and an event determination table 160, in order to realize the function to instruct, by means of communication via a message, the server device 20 and the video recorder 30 to record a target program when the target program has encountered a specific event that prevents the target program from being recorded.

The recorded program information table 110 stores information concerning the TV programs being recorded and pre-programmed by the TV recording device 103.

The function activation detection part 151 detects the activation or non-activation of the above-mentioned function (the moving picture/audio replay function 105, the moving picture/audio recording function 106, the digital camera function 107 and the telephone/communication function 108) which may prevent a TV program from being recorded by taking part in competition for the use of resources (resource competition), example of resources including the CPU 201, the bus and the receiver (TV tuner 212), and notifies to the event occurrence detection part 154 if an activation event is detected.

The memory shortage detection part 152 continuously monitors the memory capacity (remaining capacity) of the recording memory 104, and detects and notifies to the event occurrence detection part 154 if the remaining capacity of the recording memory 104 falls below the pre-configured threshold.

The low voltage detection part 153 continuously monitors the voltage state of the battery 109 in the mobile terminal 10, and detects and notifies to the event occurrence detection part 154 if the voltage value falls below the pre-configured threshold.

On being notified of the occurrence of an event or a combination of events by one or more of the detection parts, the event occurrence detection part 154 determines whether or not the notified event or combination of events justifies the issuance of an instruction of recording or pre-programming the TV program in question, based on the event determination table 160.

If it determines that the event(s) justifies the issuance of an instruction of recording or pre-programming the TV program, the event occurrence detection part 154 acquires the information concerning the pre-programmed or in-recording TV program as of the occurrence of the event(s), and, by referencing the recorded program information table 110, prompts the message transmission/reception part 155 to transmit a message which instructs the server device 20 or the video recorder 30 to pre-program or record such TV program.

The event determination table 160 contains the preset information as to whether or not a pre-program or record instruction of the TV program should be issued for each specific event or combination of events notified from one or more detection parts.

The message transmission/reception part 155 transmits a message which instructs the pre-program or recording of the TV program notified by the event occurrence detection part 154 (hereinafter referred to as an "instruction message") to the server device 20 or the video recorder 30 connected with the mobile terminal via the network 50, by means of a message communication means, such as an email or short message.

Each notification from the event occurrence detection part 154 includes information concerning the target TV program and the contents of a command to be issued to the server device 20 or the video recorder 30 (a record or pre-program command). The message transmission/reception part 155 has preset address information for the server device 20 and the video recorder 30 to which the above-described instruction message should be transmitted, and, on receiving a notification from the event occurrence detection part 154, automatically transmits the instruction message by specifying the preset address as appropriate.

Each instruction message includes several items of information: the channel of the broadcast station through which the TV program will be broadcast, the name of the program, the recording start time and end time, which are specified in the TV program information from the event occurrence detection part 154, and a command which the server device 20 or the video recorder 30 can receive and execute to operate the relevant functions.

To each instruction message, a designation of the image quality (bit rate) to use in the recording and some other designations can be added. The content of the instruction message to be sent depends on the capabilities of the server device 20 or the video recorder 30.

While in this embodiment the activation of the above-mentioned functions, memory shortage and battery exhaustion are described as the examples of events (causes) that prevent a target program from being recorded, it should be appreciated that various other events (causes) that preclude the recording are possible, depending on the type or other factors of the mobile terminal 10.

Figure 4:
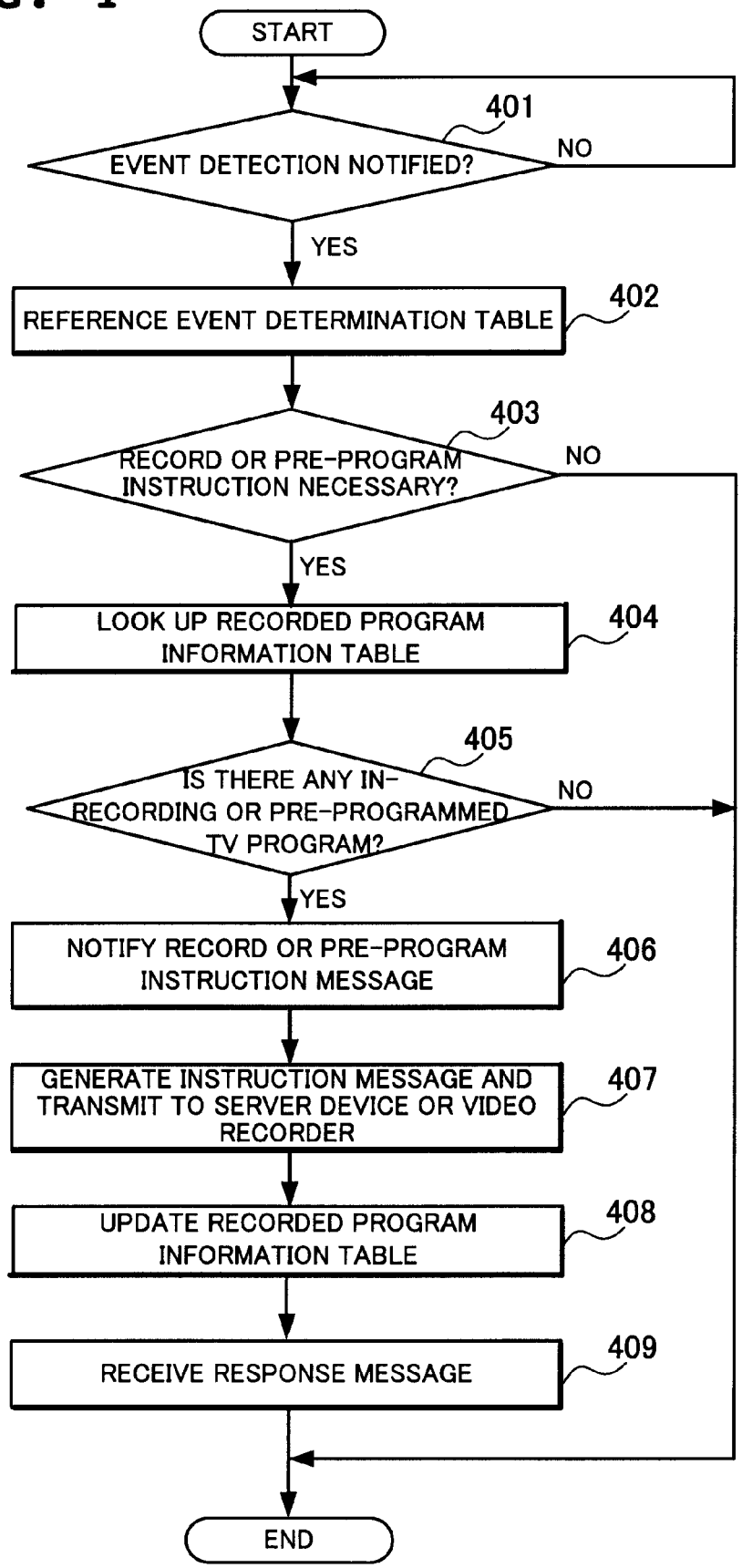
FIG. 4 is a flow chart which illustrates the operation of the mobile terminal according to the first embodiment performed to instruct the recording or pre-programming of a TV program.

Next, the operation performed by the mobile terminal 10 according to this embodiment to instruct the recording or pre-programming of a TV program will be described with reference to the flow chart in FIG. 4.

The event occurrence detection part 154 determines whether or not any one or more of the function activation detection part 151, the memory shortage detection part 152 and the low voltage detection part 153 has notified a detection of an event (Step 401). If not, the event occurrence detection part 154 goes into a wait mode.

On receiving a detection notification, the event occurrence detection part 154 references the event determination table 160 (Step 402) and determines whether or not a record or pre-program instruction should be issued (Step 403).

As shown in FIG. 5, the event determination table 160 contains predetermined rules as to how a record/pre-program instruction should be made for each of the events notified by the detection parts.

More specifically, as shown in FIG. 5, a value "A" which indicates that a record or pre-program instruction should be issued immediately after receiving a notification, is set to the notification of memory shortage from the memory shortage detection part 152 and to the notifications of low voltage from the low voltage detection part 153. A value "B," which indicates a record or pre-program instruction should be issued if a plurality of functions have been activated and are running concurrently, is set to each of the activation notifications from the different function activation detection parts 151.

For example, if a notification of activation of the telephone/communication function is received from the function activation detection part 151 and if this is the only notification from a detection part, the event occurrence detection part 154 does not determine that a record or pre-program instruction must be issued. On the other hand, if a notification of activation of another function, e.g., the camera function, is also received, then the event occurrence detection part 154 determines that a record or pre-program instruction must be issued.

If it determines that a record or pre-program instruction must be issued based on the event determination table 160, the event occurrence detection part 154 further looks up the recorded program information table 110 (Step 404) and determines whether or not there is any in-recording or pre-programmed TV program (Step 405) at the time of event occurrence (date and time).

The recorded program information table 110 contains several items of information concerning a TV program which is being recorded or has been pre-programmed by the TV recording device 103 of the mobile terminal 10, such as, as shown in FIG. 6, TV program name 110-1, broadcast station 110-2, receiving channel 110-3, recording start time 110-4, recording end time 110-5 and record or pre-program instruction 110-6. In addition to TV program name 110-1, program ID, G code and other similar information may also be recorded in this table.

The information items concerning an in-recording or pre-programmed TV program listed in the recorded program information table 110 as shown in FIG. 6 are used by way of example only. The only rule for information items concerning a TV program is to meet the minimum requirement for identifying a TV program. Therefore, broadcast station 110-2 and some other information items do not necessarily have to be included in the table in the example of FIG. 6.

As for pre-programmed TV programs, those that are pre-programmed for the times within a predetermined period of time from the occurrence of an event are subjected to determination by the event occurrence detection part 154. This range of time period, for example, one hour or three hours, is preset in the event occurrence detection part 154.

If there is any in-recording or pre-programmed TV program, the event occurrence detection part 154 prompts the message transmission/reception part 155 to transmit an instruction message which instructs the recording or pre-programming of a TV program by specifying the various items of information, such as the channel of the broadcast station which broadcasts the TV program, TV program name, recording start time and recording end time, as the information on the TV program (Step 406).

Based on the identification information specified by the event occurrence detection part 154, the message transmission/reception part 155 generates a record or pre-program instruction message 200 and transmits the message to the server device 20 or the video recorder 30 (Step 407). A designation of the image quality (bit rate) appropriate for the length of recording time and some other designations may be added to this instruction message.

Figure 7:
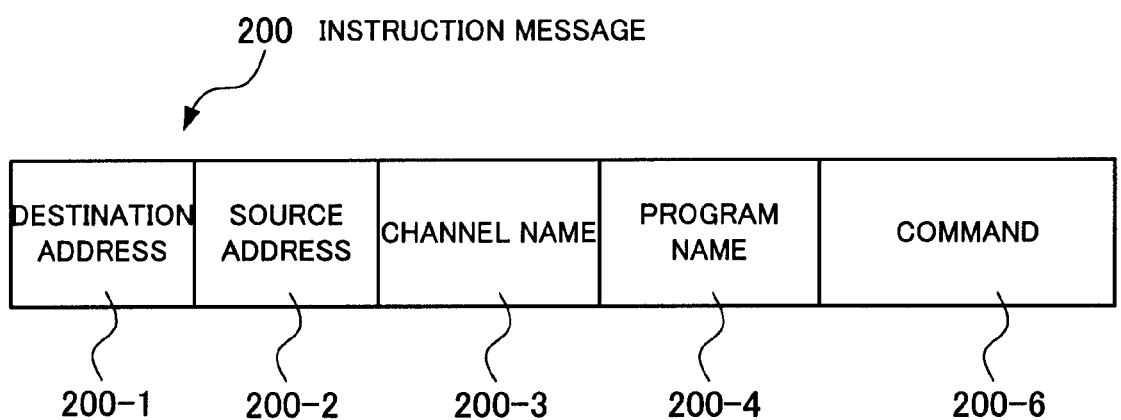
FIG. 7 is a diagram which shows a format configuration example of an instruction message to be transmitted according to the first embodiment of the present invention.

FIG. 7 shows a format configuration example of an instruction message 200 to be transmitted to the server device 20 or the video recorder 30.

This instruction message 200 contains destination address 200-1, which identifies the server device 20 or the video recorder 30 to receive the record or pre-program instruction, source address 200-2, which identifies the mobile terminal 10, channel name 200-3, TV program name (program ID) 200-4 and command 200-6. In addition to these items, recording start/end times and G CODE, for example, may be included.

In command 200-6, a command (e.g., record, pre-program, cancel pre-program, abort recording or delete recorded data) is specified to provide a specific instruction to the server device 20 or the video recorder 30.

The format configuration for the instruction message 200 shown in FIG. 7 is an example only. This format may be changed to include recording start/end times instead of TV program name (program ID) 200-4, for example.

After the instruction message 200 is transmitted, the recorded program information table 110 is updated by placing a "Completed" mark in the column for the record or pre-program instruction 110-6 which corresponds to the TV program for which the record or pre-program instruction was issued (Step 408).

The message transmission/reception part 155 receives a response message to the transmitted instruction message 200 from the server device 20 or the video recorder 30 (Step 409). By displaying this response message on the display part of the mobile terminal 10, it becomes possible to confirm that the record or pre-program instruction was accepted by the server device 20 or the video recorder 30.

A response message will be received only if the server device 20 or the video recorder 30 is provided with a function to respond to an instruction message 200.

By the operation described in the foregoing, it is made sure that the transmitted instruction message 200 is received via the network 50 by the server device 20 or the video recorder 30 designated as a destination, and that the recording or pre-programming is performed on the server device 20 or the video recorder 30 in accordance with the received instruction message 200.

According to the first embodiment, it is made possible to avoid a TV program from failing to be recorded due to the occurrence of an event which may preclude the operation of the TV program recording function by adopting a configuration in which, if an event occurs, the event is detected and an instruction message 200 which instructs the recording or pre-programming of a TV program which is being recorded or which has been pre-programmed is transmitted to the external server device 20 or the video recorder 30.

Embodiment 2

The second exemplary embodiment of the present invention will now be described. The system configuration of a TV program recording system for a mobile terminal according to the second embodiment is the same as the first embodiment shown in FIG. 3.

In this embodiment, the mobile terminal 10 is provided with a function to instruct the abortion of a recording, the cancellation of a pre-program or other actions if an event which triggered a record or pre-program instruction has disappeared after issuing such instruction to the server device 20 or the video recorder 30, by use of an instruction message via the email or short message service, in a similar manner to when issuing a record or pre-program instruction.

The first embodiment is configured to transmit an instruction message which instructs the recording or pre-programming of a TV program to the server device 20 or the video recorder 30 when a predetermined event occurs. In this case, if the event disappears and it becomes possible to perform the recording on the mobile terminal 10 side, the TV program will still be recorded, causing the recording of unnecessary TV contents to be performed by the server device 20 or the video recorder 30. Under such circumstances, this embodiment enables the user to instruct the server device 20 or the video recorder 30 to abort the recording or cancel the pre-program, as applicable.

The configuration of the mobile terminal 10 according to the second embodiment is the same as the first embodiment shown in FIG. 1. This embodiment differs from the first embodiment in that the event detection part 154 has a function to instruct the abortion of a recording or the cancellation of a pre-program, in addition to the function to instruct the recording or pre-programming of a TV program on the occurrence of an event.

The operation of the mobile terminal 10 according to the second embodiment will be described with reference to the flow chart in FIG. 8. A description of the operation to instruct the recording or pre-programming of a TV program is omitted because it is the same as the first embodiment shown in FIG. 4.

Figure 8:
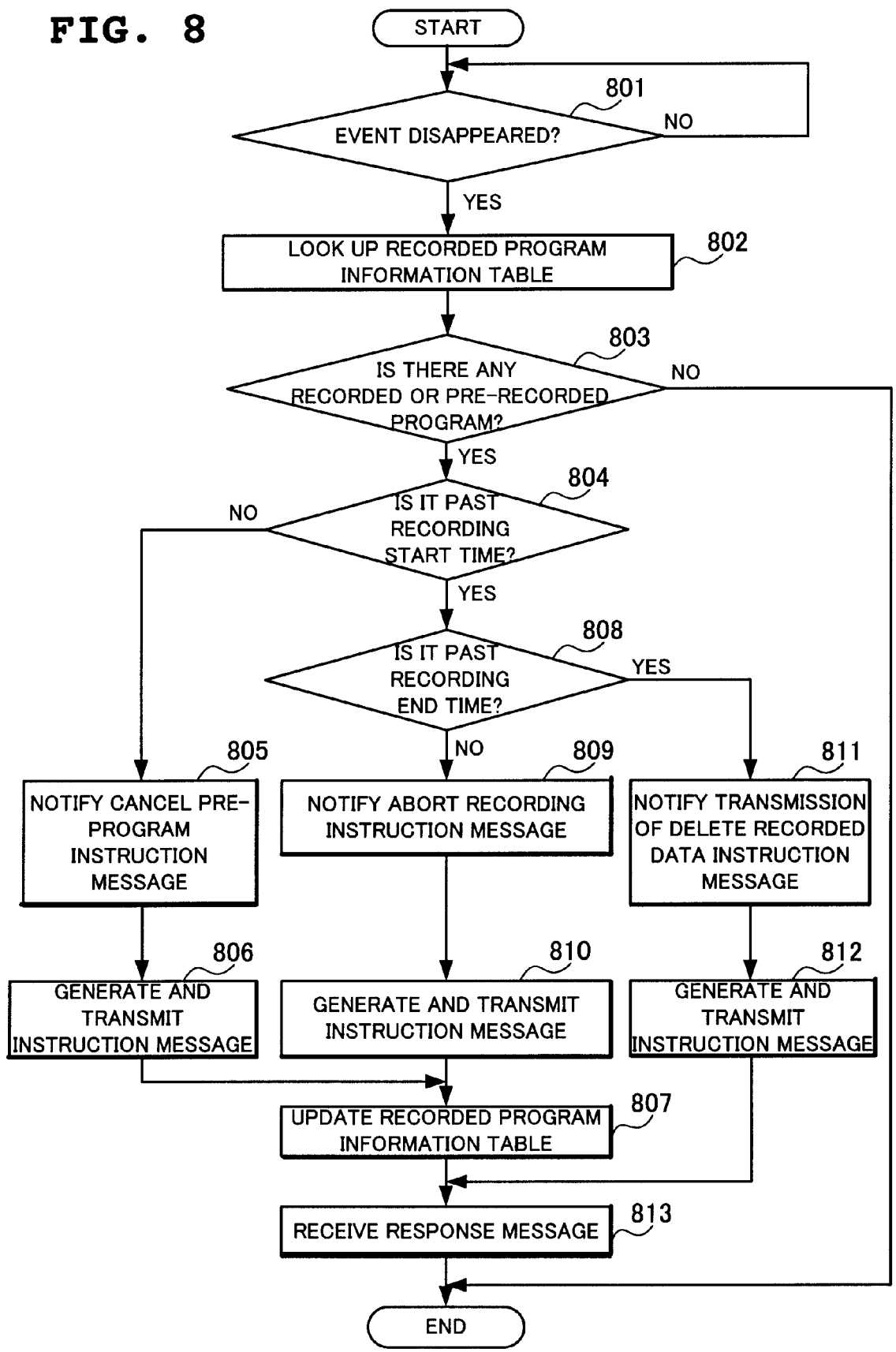
FIG. 8 is a flow chart which illustrates the operation of a mobile terminal according to the second embodiment of the present invention performed to instruct the abortion of a recording or the cancellation of a pre-program.

FIG. 8 is a flow chart which illustrates the operation performed when the event detection part 154 instructs the abortion of a recording, the cancellation of a pre-program or other actions.

The event occurrence detection part 154 continuously monitors the occurrence, continuation or disappearance of events, and determines if each event which triggered a particular record or pre-program instruction to the server device 20 or the video recorder 30 is continuing or has disappeared (Step 801).

On detecting the disappearance of an event, the event occurrence detection part 154 looks up the recorded program information table 110 (Step 802), and determines whether or not there is currently any TV program for which it has instructed the recording or pre-programming by transmitting an instruction message 200 to the server device 20 or the video recorder 30 (Step 803). This determination is performed according to the content of the record or pre-program instruction 110-6 in the recorded program information table 110.

If there is no in-recording or pre-programmed TV program, the event occurrence detection part 154 ends the processing without any action.

If there is an in-recording or pre-programmed TV program, the event occurrence detection part 154 determines whether or not it is past the record start time for the TV program in question, based on the information which identifies this TV program, such as the channel of the broadcast station, TV program name, recording start time and recording end time for the TV program, as the information on the TV program (Step 804).

If it is not past the recording start time, it means that the recording of the TV program has not started yet, so the event occurrence detection part 154 prompts the message transmission/reception part 155 to transmit an instruction message 200 which instructs the cancellation of the pre-program for the TV program by specifying the information identifying the TV program, such as the channel of the broadcast station, TV program name, recording start time and recording end time for the TV program, as the information on the TV program (Step 805).

Based on the information specified by the event occurrence detection part 154, the message transmission/reception part 155 generates an instruction message 200 which instructs the cancellation of the pre-program for the TV program and transmits the message to the server device 20 or the video recorder 30 (Step 806).

In this case, a cancel pre-program command is specified in the command 200-6 to be included in this instruction message 200.

After the instruction message 200 is transmitted, the recorded program information table 110 is updated by changing the "Completed" mark to "Yet to be completed" in the column for the record or pre-program instruction 110-6 which corresponds to the TV program for which the cancel pre-program instruction was issued (Step 807).

If the event occurrence detection part 154 determines in Step 804 that it is past the recording start time, it means that the recording of the TV program has already begun, so the event occurrence detection part 154 determines whether or not it is past the recording end time for the TV program (Step 808).

If it is not past the recording end time, the TV program is being recorded, so the event occurrence detection part 154 prompts the message transmission/reception part 155 to transmit an instruction message 200 which instructs the abortion of the recording by specifying the information which identifies the TV program, such as the channel of the broadcast station, TV program name, recording start time and recording end time for the TV program, as the information on the TV program (Step 809).

Based on the information specified by the event occurrence detection part 154, the message transmission/reception part 155 generates an instruction message 200 which instructs the abortion of the recording and transmits the message to the server device 20 or the video recorder 30 (Step 810).

In this case, an abort recording command is specified in the command 200-6 to be included in this instruction message 200.

After the instruction message 200 is transmitted, the recorded program information table 110 is updated by changing the "Completed" mark to "Yet to be completed" in the column for the record or pre-program instruction 110-6 which corresponds to the TV program for which the abort recording instruction was issued (Step 807).

If it is past the recording end time in Step 808, it means that the recording of the TV program has completed and recorded data is already stored in the server device 20 or the video recorder 30, so the event occurrence detection part 154 prompts the message transmission/reception part 155 to transmit an instruction message 200 which instructs the deletion of the recorded data by specifying the information which identifies the TV program, such as the channel of the broadcast station, TV program name, recording start time and recording end time for the TV program, as the information on the TV program (Step 811).

Based on the information specified by the event occurrence detection part 154, the message transmission/reception part 155 generates an instruction message 200 which instructs the deletion of the recorded data and transmits the message to the server device 20 or the video recorder 30 (Step 812).

In this case, a delete recorded data command is specified in the command 200-6 to be included in this instruction message 200.

After the delete recorded data instruction message is transmitted, the recorded program information table 110 in Step 807 is not updated.

After a cancel pre-program or abort recording instruction message is transmitted and the recorded program information table 110 is updated in Step 807, or after a delete recorded data instruction message is transmitted in Step 812, the message transmission/reception part 155 receives a response message from the server device 20 or the video recorder 30 in response to the transmitted instruction message 200 (Step 813). By displaying this response message on the display part of the mobile terminal 10, it becomes possible to confirm that the abort recording, cancel pre-program or delete recorded data instruction was accepted by the server device 20 or the video recorder 30.

A response message will be received only if the server device 20 or the video recorder 30 is provided with a function to respond to an instruction message 200.

According to the second embodiment, it is possible to prevent unnecessary TV contents from being recorded by the server device 20 or the video recorder 30 because a configuration is adopted in which, after a predetermined event occurs and an instruction message which instructs the recording or the pro-programming of a TV program is transmitted to the server device 20 or the video recorder 30, another instruction is transmitted which instructs the abortion of the recording or the cancellation of the pre-program of the TV program to the server device 20 or the video recorder 30 if the event disappears on the mobile terminal side 10 and it becomes possible for the mobile terminal 10 to record the TV program.

Embodiment 3

The third exemplary embodiment of the present invention will be described below. The system configuration of a TV program recording system for a mobile terminal according to the third embodiment is the same as the first embodiment shown in FIG. 3.

A mobile terminal 10a according to this embodiment is provided with a function to predict a possibility that a factor (event) which will prevent a recording from being performed will occur during a period from the completion of pre-programming the recording until the start of the recording or in the middle of the recording on the TV broadcast reception device, and to instruct the server device or the video recorder to perform the recording or pre-programming before such event actually occurs by using an instruction message 200 via email, short message or other means.

This embodiment predicts battery exhaustion, activation of a specific function (in particular, those functions (applications which implement these functions) whose activation can be predicted based on the timer function), memory shortage associated with an internal memory (HDD or DRAM) or a removable media (memory card 114) or weakening of radio wave signals received from a cellular phone base station, and to instruct the server device or the video recorder to perform the recording or pre-programming by use of an instruction message 200 via email, short message or other means.

A description of the hardware configuration of a mobile terminal 10a according to this embodiment is omitted because it is the same as the first embodiment shown in FIG. 2.

Figure 9:
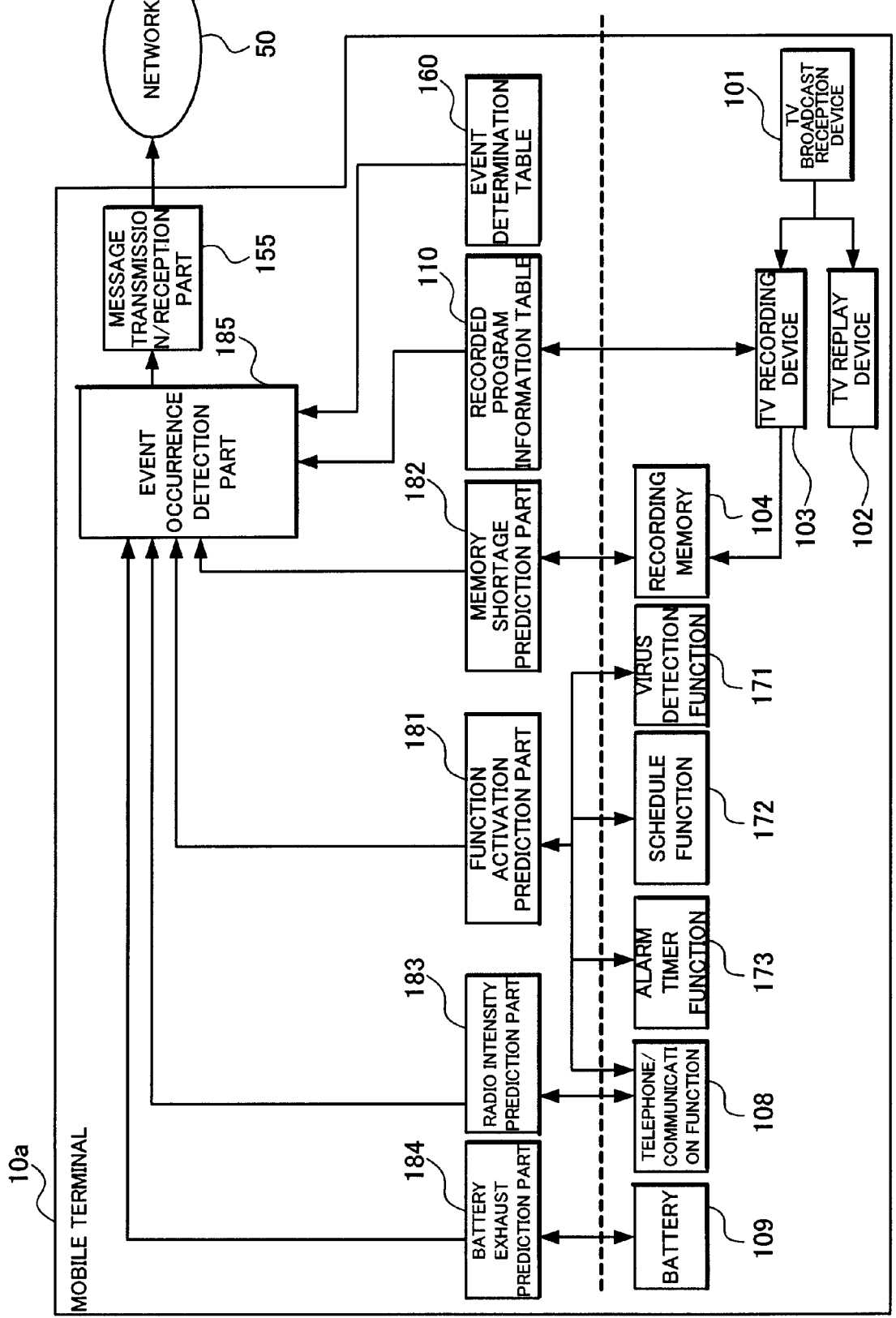
FIG. 9 is a functional block diagram which shows the functions of a mobile terminal according to the third embodiment of the present invention implemented as a cellular phone with a TV reception function.

FIG. 9 is a functional block diagram which shows the functions of a mobile terminal 10a according to the third embodiment implemented as a cellular phone with a TV reception function.

In FIG. 9, the mobile terminal 10a is provided with a TV broadcast reception device 101, a TV replay device 102, a TV recording device 103, a recording memory 104, a telephone function 108, a battery 109, a virus detection function 171, a schedule function 172 and an alarm timer function 173. The virus detection function 171, the schedule function 172 and the alarm timer function 173 can be activated by the timer 212 at a designated date and time, and thus it is possible to predict their activation based on the designated date and time of activation.

The mobile terminal 10a is further provided with a recorded program information table 110, a function activation prediction part 181, a memory shortage prediction part 182, a radio intensity prediction part 183, a battery exhaust prediction part 184, an event occurrence detection part 185, a message transmission/reception part 155 and an event determination table 160.

This embodiment is the same as the first embodiment in that the recorded program information table 110 stores the information concerning the TV program which is being recorded or which has been pre-programmed by the TV recording device 103 and that the event determination table 160 contains the preset information as to whether or not a pre-program or record instruction of the TV program should be issued for each specific event or combination of events notified from one or more detection parts.

The function activation prediction part 181 monitors the date and time of activation of each of the above-mentioned functions, i.e., the telephone/communication function 108, the virus detection function 171, the schedule function 172 and the alarm timer function 173, which may preclude the operation to record a TV program by competing for the use of resources (resource competition), including the CPU 201, the bus, the receiver (TV tuner 212) and so forth. The function activation prediction part 181 also notifies the event detection part 185 of, for example, a prediction of the occurrence of an event which indicates that one of these functions will activate, at a point in time corresponding to a predetermined length of time before the date and time at which the function is configured to be activated.

The memory shortage prediction part 182 continuously monitors the rate of temporal variation in the memory capacity (remaining capacity) and memory consumption of the recording memory 104, and notifies the event occurrence detection part 185 of a prediction of the occurrence of a memory shortage event at a point in time corresponding to a predetermined length of time before the time at which the remaining capacity of the recording memory 104 is expected to reach a predetermined value (the level of memory capacity judged to result in a memory shortage).

The radio intensity prediction part 183 continuously monitors the telephone/communication function 108 for the intensity of radio waves (which are received from a cellular phone base station) and its temporal variation, and notifies the event occurrence detection part 185 of a prediction of the occurrence of a low radio wave intensity event at a point in time corresponding to a predetermined length of time before the time at which the mobile terminal 10a is expected to become unable to communicate due to a low radio wave intensity.

The inability to communicate based on the intensity of radio waves received by the telephone/communication function 108 is predicted because it will become impossible for the message transmission/reception part 155 to transmit an instruction message (instruction to record or pre-program the TV program) if communication is actually disrupted.

The battery exhaust prediction part 184 continuously monitors the voltage state and temporal voltage falling tendency for the battery 109 mounted on the mobile terminal 10a, and notifies the event occurrence detection part 185 of a prediction of the occurrence of a battery exhaust event at a point in time corresponding to a predetermined length of time before the time at which the voltage value for the battery 109 will fall below a pre-configured threshold (a voltage value judged to be a battery exhaust).

On being notified of an event occurrence prediction by one or more of the detection parts, the event occurrence detection part 185 determines whether or not the notified event or combination of events justifies the issuance of an instruction to record or pre-program the TV program in question, based on the event determination table 160.

If it determines that the event(s) justifies the issuance of an instruction to record or pre-program the TV program, the event occurrence detection part 185 acquires the information concerning the pre-programmed or in-recording TV program as of the prediction of the event(s), and, by referencing the recorded program information table 110, prompts the message transmission/reception part 155 to transmit a message which instructs the server device 20 or the video recorder 30 to pre-program or record such TV program.

The message transmission/reception part 155 generates and transmits a message which instructs the pre-program or recording of the TV program notified by the event occurrence detection part 185 (an "instruction message 200") to the server device 20 or the video recorder 30 connected with the mobile terminal via the network 50, by means of a message communication means, such as an email or short message.

Each notification from the event occurrence detection part 185 includes information concerning the target TV program and the contents of a command to be issued to the server device 20 or the video recorder 30 (a record or pre-program command). The message transmission/reception part 155 has preset address information for the server device 20 and the video recorder 30 to which the above-described instruction message 200 should be transmitted, and, on receiving a notification from the event occurrence detection part 185, automatically transmits the instruction message 200 by specifying the preset address as appropriate.

Figure 10:
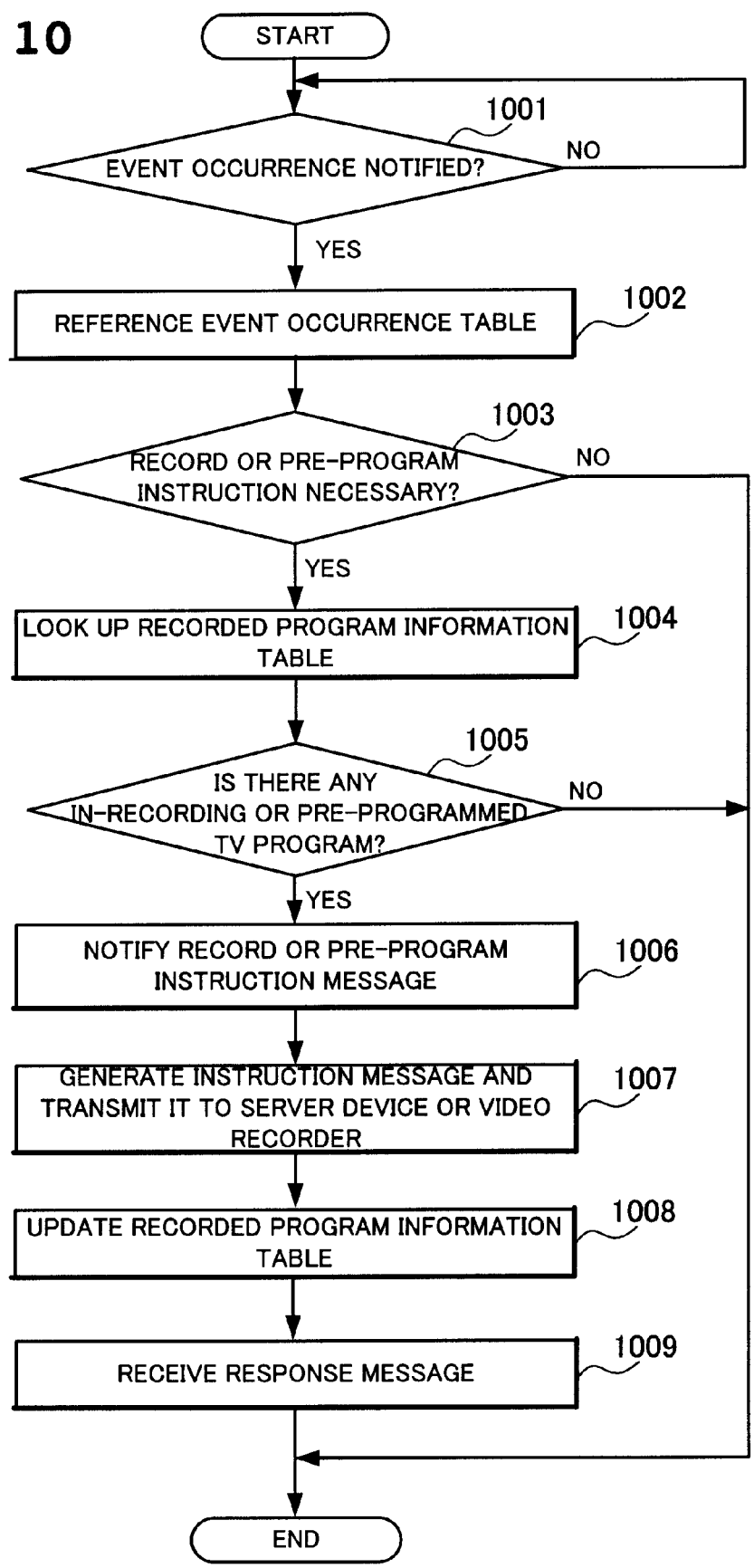
FIG. 10 is a flow chart which illustrates the operation of the mobile terminal according to the third embodiment of the present invention performed to instruct the recording or pre-programming of a TV program.

Next, the operation performed by the mobile terminal 10a according to this embodiment to instruct the recording or pre-programming of a TV program will be described with reference to the flow chart in FIG. 10.

The event occurrence detection part 185 determines whether or not any notification of event occurrence prediction has arrived from the function activation prediction part 181, the memory shortage prediction part 182, the radio intensity prediction part 183 and/or the battery exhaust prediction part 184 (Step 1001). If there is no notification of an event occurrence prediction, the event occurrence detection part 185 goes into a wait mode.

On receiving a notification of an event occurrence prediction, the event occurrence detection part 185 references the event determination table 160 (Step 1002) and determines whether or not a record or pre-program instruction should be issued (Step 1003).

Figure 11:
FIG. 11 is a diagram which shows a configuration example of an event determination table according to the third embodiment of the present invention.

As shown in FIG. 11, the event determination table 160 contains predetermined rules as to how a record/pre-program instruction should be made for each of the events which are indicated in event occurrence predictions notified by each detection parts.

In the example shown in FIG. 11, a value "A," which indicates that a record/pre-program instruction should be issued immediately after receiving a notification, is set to the event occurrence prediction of a memory shortage from the memory shortage detection part 182, the event occurrence prediction of a battery exhaust from the battery exhaust prediction part 184 and the event occurrence prediction of a low radio intensity from the radio intensity prediction part 183. A value "B," which indicates a record/pre-program instruction should be issued if a plurality of functions have been activated and are running concurrently, is set to each of the activation notifications from the different function activation detection parts 181.

If it determines that a recording/pre-programming instruction must be issued based on the event determination table 160, the event occurrence detection part 185 further looks up the recorded program information table 110 (Step 1004) and determines whether or not there is any in-recording or pre-programmed TV program (Step 1005) at the time of event occurrence (date and time).

The content of the recorded program information table 110 is as shown in FIG. 6.

As for pre-programmed TV programs, those that are pre-programmed for the times within a predetermined period of time from the occurrence of an event are subjected to determination by the event occurrence detection part 185. Similarly to the first embodiment, this range of time period, for example, one hour or three hours, is preset in the event occurrence detection part 185.

If there is any in-recording or pre-programmed TV program, the event occurrence detection part 185 prompts the message transmission/reception part 155 to transmit an instruction message 200 which instructs the recording or pre-programming of a TV program by specifying the various items of information, such as the channel of the broadcast station which broadcasts the TV program, TV program name, recording start time and recording end time, as the information on the TV program (Step 1006).

Based on the identification information specified by the event occurrence detection part 185, the message transmission/reception part 155 generates a record or pre-program instruction message 200 and transmits the message to the server device 20 or the video recorder 30 (Step 1007). A designation of the image quality (bit rate) appropriate for the length of recording time and some other designations may be added to this instruction message.

The format configuration of this instruction message 200 is the same as the first embodiment shown in FIG. 7.

After the instruction message 200 is transmitted, the recorded program information table 110 is updated by placing a "Completed" mark in the column for the record/pre-program instruction 110-6 which corresponds to the TV program for which the record/pre-program instruction was issued (Step 1008).

The message transmission/reception part 155 receives a response message to the transmitted instruction message 200 from the server device 20 or the video recorder 30 (Step 1009). By displaying this message on the display part of the mobile terminal 10a, it becomes possible to confirm that the record/pre-program instruction was accepted by the server device 20 or the video recorder 30.

A response message will be received only if the server device 20 or the video recorder 30 is provided with a function to respond to an instruction message 200.

By the operation described in the foregoing, it is made sure that the transmitted instruction message 200 is received via the network 50 by the server device 20 or the video recorder 30 designated as a destination, and that the recording or pre-programming is performed on the server device 20 or the video recorder 30 in accordance with the received instruction message 200.

According to the third embodiment, it is made possible to avoid a TV program from failing to be recorded due to the occurrence of an event which may preclude the operation of the TV program recording function by adopting a configuration in which, if an event occurs, the event is detected and an instruction message 200 which instructs the recording or pre-programming of a TV program which is being recorded or which has been pre-programmed is transmitted to the external server device 20 or the video recorder 30.

Embodiment 4

The fourth exemplary embodiment of the present invention will be described below. The system configuration of a TV program recording system for a mobile terminal according to the fourth embodiment is the same as the first embodiment shown in FIG. 3.

In this embodiment, the mobile terminal 10a according to the third embodiment is provided with a function to instruct the abortion of a recording, the cancellation of a pre-program or other actions if an event which triggered a record/pre-program instruction has disappeared (if the possibility of the occurrence of the factor which will preclude the recording is reduced) after issuing such instruction to the server device 20 or the video recorder 30, by use of an instruction message via the email or short message service.

The third embodiment is configured to predict the occurrence of an event and instruct the server device 20 or the video recorder 30 to record or pre-program the recording of a TV program before the event actually occurs. In this case, if the possibility of the occurrence of the event is reduced on the mobile terminal 10 side and it becomes possible to perform the recording on the mobile terminal 10a side, the TV program will still be recorded, causing the recording of unnecessary TV contents to be performed by the server device 20 or the video recorder 30. Under such circumstances, this embodiment enables the user to instruct the server device 20 or the video recorder 30 to abort the recording or cancel the pre-program, as applicable.

The configuration of the mobile terminal 10a according to the fourth embodiment is the same as the third embodiment shown in FIG. 9. This embodiment differs from the third embodiment in that the event detection part 185 has a function to instruct the abortion of a recording, the cancellation of a pre-program and the deletion of recorded data, in addition to the function to instruct the recording or pre-programming of a TV program by predicting the occurrence of an event.

The operation of the mobile terminal 10a according to the fourth embodiment will be described with reference to the flow chart in FIG. 12. A description of the operation to instruct the recording or pre-programming of a TV program is omitted because it is the same as the third embodiment shown in FIG. 10.

FIG. 12 is a flow chart which illustrates the operation performed when the event detection part 185 instructs the abortion of a recording, the cancellation of a pre-program or other actions.

The event occurrence detection part 185 continuously monitors the occurrence, continuation or disappearance of event predictions notified from the different prediction parts, and determines if each event which triggered a particular record or pre-program instruction to the server device 20 or the video recorder 30 is continuing or has disappeared (Step 1201).

On detecting the disappearance of an event, the event occurrence detection part 185 looks up the recorded program information table 110 (Step 1202), and determines whether or not there is currently any TV program for which it has instructed the recording or pre-programming by transmitting an instruction message 200 to the server device 20 or the video recorder 30 (Step 1203). This determination is performed according to the content of the record/pre-program instruction 110-6 in the recorded program information table 110.

If there is no in-recording or pre-programmed TV program, the event occurrence detection part 185 ends the processing without any action.

If there is an in-recording or pre-programmed TV program, the event occurrence detection part 185 determines whether or not it is past the record start time for the TV program in question, based on the information which identifies this TV program, such as the channel of the broadcast station, TV program name, recording start time and recording end time for the TV program, as the information on the TV program (Step 1204).

If it is not past the recording start time, it means that the recording of the TV program has not started yet, so the event occurrence detection part 185 prompts the message transmission/reception part 155 to transmit an instruction message 200 which instructs the cancellation of the pre-program for the TV program by specifying the information which identifies the TV program, such as the channel of the broadcast station, TV program name, recording start time and recording end time for the TV program, as the information on the TV program (Step 1205).

Based on the information specified by the event occurrence detection part 185, the message transmission/reception part 155 generates an instruction message 200 which instructs the cancellation of the pre-program for the TV program and transmits the message to the server device 20 or the video recorder 30 (Step 1206).

In this case, a cancel pre-program command is specified in the command 200-6 to be included in this instruction message 200.

After the instruction message 200 is transmitted, the recorded program information table 110 is updated by changing the "Completed" mark to "Yet to be completed" in the column for the record/pre-program instruction 110-6 which corresponds to the TV program for which the cancel pre-program instruction was issued (Step 1207).

If the event occurrence detection part 185 determines in Step 1204 that it is past the recording start time, it means that the recording of the TV program has already begun, so the event occurrence detection part 185 determines whether or not it is past the recording end time for the TV program (Step 1208).

If it is not past the recording end time, it means that the TV program is being recorded, so the event occurrence detection part 185 prompts the message transmission/reception part 155 to transmit an instruction message 200 which instructs the abortion of the recording by specifying the information which identifies the TV program, such as the channel of the broadcast station, TV program name, recording start time and recording end time for the TV program, as the information on the TV program (Step 1209).

Based on the information specified by the event occurrence detection part 185, the message transmission/reception part 155 generates an instruction message 200 which instructs the abortion of the recording and transmits the message to the server device 20 or the video recorder 30 (Step 1210).

In this case, an abort recording command is specified in the command 200-6 to be included in this instruction message 200.

After the instruction message 200 is transmitted, the recorded program information table 110 is updated by changing the "Completed" mark to "Yet to be completed" in the column for the record/pre-program instruction 110-6 which corresponds to the TV program for which the abort recording instruction was issued (Step 1207).

If it is past the recording end time in Step 1208, it means that the recording of the TV program has completed and recorded data is already stored in the server device 20 or the video recorder 30, so the event occurrence detection part 185 prompts the message transmission/reception part 155 to transmit an instruction message 200 which instructs the deletion of the recorded data by specifying the information which identifies the TV program, such as the channel of the broadcast station, TV program name, recording start time and recording end time for the TV program, as the information on the TV program (Step 1211).

Based on the information specified by the event occurrence detection part 185, the message transmission/reception part 155 generates an instruction message 200 which instructs the deletion of the recorded data and transmits the message to the server device 20 or the video recorder 30 (Step 1212).

In this case, a delete recorded data command is specified in the command 200-6 to be included in this instruction message 200.

After the delete recorded data instruction message is transmitted, the recorded program information table 110 in Step 1207 is not updated.

After a cancel pre-program or abort recording instruction message is transmitted and the recorded program information table 110 is updated in Step 1207, or after a delete recorded data instruction message is transmitted in Step 1212, the message transmission/reception part 155 receives a response message from the server device 20 or the video recorder 30 in response to the transmitted instruction message 200 (Step 1213). By displaying this response message on the display part of the mobile terminal 10a, it becomes possible to confirm that the abort recording, cancel pre-program or delete recorded data instruction was accepted by the server device 20 or the video recorder 30.

A response message will be received only if the server device 20 or the video recorder 30 is provided with a function to respond to an instruction message 200.

According to the fourth embodiment, it is possible to avoid unnecessary TV contents from being recorded by the server device 20 or the video recorder 30 and to avoid unnecessary recorded data from remaining on the server device 20 or the video recorder 30, because a configuration is adopted in which, after the occurrence of a predetermined event is predicted and an instruction message which instructs the recording or the pro-programming of a TV program is transmitted to the server device 20 or the video recorder 30, another instruction is transmitted which instructs the abortion of the recording or the cancellation of the pre-program of the TV program or the deletion of the recorded data if the event disappears on the mobile terminal 10a side and it becomes possible for the mobile terminal 10a to record the TV program.

While each of the functions of the mobile terminals according to the above-described embodiments can of course be implemented using hardware, it is also possible to use software to implement the functions performed by these components. In this case, the process of instructing the performance of a recording or pre-programming via any of the above-described instruction messages is realized by software by executing computer programs (TV recording programs) having these functions on the CPU 201 of the mobile terminal 10.

While the present invention has been described by taking several exemplary embodiments as examples, it should be appreciated that the present invention is not limited to these preferred embodiments described above and that it can be embodied with a variety of modifications without departing from the spirit and scope of its technical principle.

For example, in the above-described embodiments, the functions shown in FIGS. 1 and 9 have been described as events that may preclude the TV program recording operation by resource competition, it goes without saying that these events can be changed to various other functions than those illustrated, depending on the type of the mobile terminal.

It is also possible to combine the first and third embodiments to configure the mobile terminal in such a manner that a recording or pre-programming is instructed based on both the occurrence of an event and a prediction of the occurrence of an event.

Furthermore, while in the second embodiment a configuration has been described in which the mobile terminal 10 according to the first embodiment is provided with a function to instruct the abortion of a recording and the cancellation of a pre-program, this configuration can also be applied to the mobile terminal 10a according to the third embodiment.

Similarly, while in the fourth embodiment a configuration has been described in which the mobile terminal 10a according to the third embodiment is provided with a function to instruct the abortion of a recording, the cancellation of a pre-program and the deletion of recorded data, this configuration can also be applied to the mobile terminal 10 according to the first embodiment.

Therefore, by using a TV program recording system for a mobile terminal of the present invention, it is possible to avoid a TV program from failing to be recorded even if an event occurs that will preclude the operation of the TV program recording function.

Moreover, the present invention enables businesses which offer a proxy pre-program service (a service in which a server carries out on behalf of its user the recording of a pre-programmed TV program according to the pre-program made on a mobile terminal) to offer new additional services. More specifically, if the owner of a mobile terminal is planning to view or pre-program a desired TV program using the mobile terminal but has not made a pre-record on the server, the present invention enables the owner to still utilize the recording service when an event which will preclude the operation of the recording function has occurred or is expected to occur.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

The invention claimed is:

1. A mobile terminal which includes a TV receiver to receive a broadcast of a TV program and which is provided with the function of recording and pre-programming a received TV program, comprising the function of:
   detecting the occurrence of an event which will preclude the operation of the recording function of said TV program, and instructing the recording or pre-programming of the in-recording or pre-programmed TV program to an external recording device which is provided with the function of recording a TV program and which is connected with the mobile terminal via a communication line,
   wherein said event is any one of the activation of one or more other functions which compete with the TV program recording function for the use of resources, the shortage of the memory capacity to store recorded data and the depletion of the battery,
   wherein comprising
   a function activation detection part which detects the activation of the one or more other functions which compete with the TV program recording function for the use of resources,
   a memory shortage detection part which detects the shortage of the memory capacity to store recorded data,
   a low voltage detection part which detects the depletion of the battery mounted based on the level of voltage,
   an event detection part which detects the occurrence of said event by a detection notification from said function activation detection part, said memory shortage detection part or said low voltage detection part and which instructs the recording or pre-programming of an in-recording or pre-programmed TV program, and
   a message transmission/reception part which transmits said message which instructs the recording or pre-programming of the in-recording or pre-programmed TV program to said external recording device via said communication line based on an instruction from said event detection part,
   wherein further comprising a recorded program information table which records the information on in-recording and preprogrammed TV programs, and wherein
   said event detection part looks up said recorded program information table and determines whether or not there is any TV program which is being recorded or has been pre-programmed as of the occurrence of said event,
   further comprising an event determination table which records the information as to whether or not issue a pre-program or record instruction of the TV program for each specific event or combination of events,
   wherein said event detection part determines whether or not to instruct the recording or pre-programming of an in-recording or pre-programmed TV program based on said event determination table.

2. The mobile terminal according to claim 1, comprising the function of transmitting to said external recording device a message which instructs the cancellation of the recording or pre-program which was already instructed to said external recording device if the possibility of the occurrence of said event disappears.

3. The mobile terminal according to claim 1, comprising the function of, based on the recording start time and the recording end time for a TV program for which a record or pre-program instruction was issued to said external recording device, transmitting to said external recording device a message which instructs the abortion of the recording or the cancellation of the pre-program of the TV program or the deletion of the recorded data stored, if the possibility of the occurrence of said event disappears.

4. A mobile terminal which includes a TV receiver to receive a broadcast of a TV program and which is provided with the function of recording and pre-programming a received TV program, comprising the function of:
   predicting the occurrence of an event which will preclude the operation of the recording function of said TV program, and instructing the recording or pre-programming of the in-recording or pre-programmed TV program to an external recording device which is provided with the function of recording a TV program and which is connected with the mobile terminal via a communication line at a point in time corresponding to a predetermined length of time before an event occurrence prediction time.

5. The mobile terminal according to claim 4, comprising the function of issuing a record or pre-program instruction by transmitting to said external recording device the information on an in-recording or pre-programmed TV and a message which includes a record or pre-program command.

6. The mobile terminal according to claim 4 or claim 5, wherein said event is any of the activation of one or more other functions which compete with the TV program recording function for the use of resources and which is each activated on the date and time designated by a timer, the shortage of the memory capacity to store recorded data and the depletion of the battery.

7. The mobile terminal according to claim 5, comprising:
   a function activation prediction part which predicts the activation of one or more other functions which compete with the TV program recording function for the use of resources;
   a memory shortage prediction part which predicts a possible shortage of the memory capacity to store recorded data;
   a battery exhaustion prediction part which predicts a possible depletion of the battery mounted;
   an event detection part which detects the occurrence of said event by a detection notification from said function activation prediction part, said memory shortage prediction part or said battery exhaustion prediction part and which instructs the recording or pre-programming of an in-recording or pre-programmed TV program; and
   a message transmission/reception part which transmits said message which instructs the recording or pre-programming of the in-recording or pre-programmed TV program to said external recording device via said communication line based on an instruction from said event detection part.

8. The mobile terminal according to claim 6, wherein said event includes wakening of radio wave signals in communication.

9. The mobile terminal according to claim 7, further comprising a radio intensity prediction part which predicts weakening of radio wave signals in communication,
wherein said event detection part detects the occurrence of said event by a detection notification from said function activation detection part, said memory shortage detection part, said battery exhaustion prediction part or said radio intensity prediction part and instructs the recording or pre-programming of an in-recording or pre-programmed TV program.

10. The mobile terminal according to claim 7, comprising a recorded program information table which records the information on in-recording and pre-programmed TV programs, and wherein
said event detection part looks up said recorded program information table and determines whether or not there is any TV program which is being recorded or has been pre-programmed as of the occurrence of said event.

11. The mobile terminal according to claim 4 or claim 5, comprising the function of, based on the recording start time and the recording end time for a TV program for which a record or pre-program instruction was issued to said external recording device, transmitting to said external recording device a message which instructs the abortion of the recording or the cancellation of the pre-program of the TV program or the deletion of the recorded data stored, if the possibility of the occurrence of said event disappears.

12. A TV program recording system which is provided with a TV receiver to receive a broadcast of a TV program and which comprises a mobile terminal having the function of recording and pre-programming a received TV program and a recording device having the TV program recording function and connected with said mobile terminal via a communication line, wherein:
said mobile terminal either detects the occurrence of an event which will preclude the operation of said TV program recording function or predicts the occurrence of said event, and then instructs the recording or pre-programming of an in-recording or pre-programmed TV program to said recording device via said communication line at the time of event detection or at a point in time corresponding to a predetermined length of time before an event occurrence prediction time.

13. The TV program recording system according to claim 12, wherein
said mobile terminal issues a record or pre-program instruction by transmitting to said recording device the information on an in-recording or pre-programmed TV program and a message which includes a record or pre-program command; and
said recording device has the function of performing, based on said message from said mobile terminal, the recording or pre-programming of the TV program indicated in said message.

14. The TV program recording system according to claim 12 or claim 13, wherein said event is any one of the activation of one or more other functions which compete with the TV program recording function for the use of resources, the shortage of the memory capacity to store recorded data and the depletion of the battery.

15. The TV program recording system according to claim 12 or claim 13, wherein said event is any of the activation of one or more other functions which compete with the TV program recording function for the use of resources and which is each activated on the date and time designated by a timer, the shortage of the memory capacity to store recorded data and the depletion of the battery.

16. The TV program recording system according top claim 15, wherein said event includes weakening of radio wave signals in communication.

17. The TV program recording system according to claim 13, wherein
said mobile terminal comprises:
a function activation detection part which detects the activation of one or more other functions which compete with the TV program recording function for the use of resources;
a memory shortage detection part which detects the shortage of the memory capacity to store recorded data;
a low voltage detection part which detects the depletion of the battery mounted, based on the level of voltage;
an event detection part which detects the occurrence of said event by a detection notification from said function activation detection part, said memory shortage detection part and said low voltage detection part and which instructs the recording or pre-programming of an in-recording or pre-programmed TV program; and
a message transmission/reception part which transmits said message which instructs the recording or pre-programming of the in-recording or pre-programmed TV program to said recording device via said communication line based on an instruction from said event detection part.

18. The TV program recording system according to claim 13, wherein
said mobile terminal comprises:
a function activation prediction part which predicts the activation of one or more other functions which compete with the TV program recording function for the use of resources;
a memory shortage prediction part which predicts a possible shortage of the memory capacity to store recorded data;
a battery exhaustion prediction part which predicts a possible depletion of the battery mounted;
an event detection part which detects the occurrence of said event by a detection notification from said function activation prediction part, said memory shortage prediction part and said battery exhaustion prediction part and which instructs the recording or pre-programming of an in-recording or pre-programmed TV program; and
a message transmission/reception part which transmits said message which instructs the recording or pre-programming of the in-recording or pre-programmed TV program to said external recording device via said communication line based on an instruction from said event detection part.

19. The TV program recording system according to claim 17, wherein
said mobile terminal comprises:
a recorded program information table which records the information on in-recording and pre-programmed TV programs, and wherein
said event detection part looks up said recorded program information table and determines whether or not there is any TV program which is being recorded or has been pre-programmed as of the occurrence of said event.

20. The TV program recording system according to claim 12, comprising the function of transmitting to said recording device a message which instructs the cancellation of the recording or pre-program of TV program which was already instructed to said recording device if the possibility of the occurrence of said event disappears.

21. The TV program recording system according to claim 12, comprising the function of, based on the recording start time and the recording end time for a TV program for which a record or pre-program instruction was issued to said recording device, transmitting to said recording device a message which instructs the abortion of the recording or the cancellation of the pre-program of the TV program or the deletion of the recorded data stored, if the possibility of the occurrence of said event disappears.

22. A TV program recording program which includes a TV receiver to receive a broadcast of a TV program and which is executed on a mobile terminal computer having the function of recording or pre-programming a TV program received, comprising:
    causing said mobile terminal to perform the functions of:
    detecting the occurrence of an event which will preclude the operation of said TV program recording function;
    instructing the recording or pre-programming of the in-recording or pre-programmed TV program to an external recording device which is provided with the function of recording a TV program and which is connected with the mobile terminal via a communication line;
    issuing a record or pre-program instruction by transmitting to said external recording device the information on an in-recording or pre-programmed TV program as of the occurrence of said event and a message which includes a record or pre-programmed command;
    looking up a recorded program information table which is provided in said mobile terminal and which records the information on in-recording and pre-programmed TV programs and determining whether or not there is any TV program which is being recorded or has been pre-programmed as of the occurrence of said event; and
    determining whether or not instruct the recording or pre-programming of an in-recording or pre-programmed TV program based on an event determination table which records the information as to whether or not issue a pre-program or record instruction of the TV program for each specific event or combination of events,
    wherein said event is any one of the activation of one or more other functions which compete with the TV program recording function for the use of resources, the shortage of the memory capacity to store recorded data and the depletion of the battery.

23. The TV program recording program according to claim 22, comprising:
    causing said mobile terminal to perform the function of transmitting to said external recording device a message which instructs the cancellation of the recording or pre-program of TV program which was already instructed to said external recording device if the possibility of the occurrence of said event disappears.

24. The TV program recording program according to claim 22, comprising:
    causing said mobile terminal to perform the function of, based on the recording start time and the recording end time for a TV program for which a record or pre-program instruction was issued to said external recording device, transmitting to said external recording device a message which instructs the abortion of the recording or the cancellation of the pre-program of the TV program or the deletion of the recorded data stored, if the possibility of the occurrence of said event disappears.

25. The TV program recording system according to claim 18, wherein
    said mobile terminal further comprises a radio intensity prediction part which predicts wakening of radio wave signals in communication,
    wherein said event detection part detects the occurrence of said event by a detection notification from said function activation detection part, said memory shortage detection part, said battery exhaustion prediction part or said radio intensity prediction part and instructs the recording or pre-programming of an in-recording or pre-programmed TV program.

26. A TV program recording program which includes a TV receiver to receive a broadcast of a TV program and which is executed on a mobile terminal computer having the function of recording or pre-programming a TV program received, comprising:
    causing said mobile terminal to perform the function of:
    predicting the occurrence of an event which will preclude the operation of the recording function of said TV program, and instructing in advance the pre-programming of an in-recording or pre-programmed TV program to an external recording device which is provided with the function of recording a TV program and which is connected with the mobile terminal via a communication line at a point in time corresponding to a predetermined length of time before an event occurrence prediction time.

27. The TV program recording program according to claim 26, wherein said event is any of the activation of one or more other functions which compete with the TV program recording function for the use of resources and which is each activated on the date and time designated by a timer, the shortage of the memory capacity to store recorded data and the depletion of the battery.

28. The TV program recording program according to claim 26 or claim 27, comprising:
    causing said mobile terminal to execute the function of looking up a recorded program information table which is provided in said mobile terminal and which records the information on in-recording and pre-programmed TV programs and determining whether or not there is any TV program which is being recorded or has been pre-programmed as of the occurrence of said event.

29. The TV program recording program according to claim 26, comprising:
    causing said mobile terminal to perform the function of, based on the recording start time and the recording end time for a TV program for which a record or pre-program instruction was issued to said external recording device, transmitting to said external recording device a message which instructs the abortion of the recording or the cancellation of the pre-program of the TV program or the deletion of the recorded data stored, if the possibility of the occurrence of said event disappears.

30. The TV program recording program according to claim 27, wherein said event includes weakening of radio wave signals in communication.

* * * * *